United States Patent [19]
Kapron et al.

[11] 3,988,614
[45] Oct. 26, 1976

[54] EQUALIZATION OF CHROMATIC PULSE DISPERSION IN OPTICAL FIBRES

[75] Inventors: Felix Paul Kapron, Richmond; John Charles Wood Taylor, Aylmer, both of Canada

[73] Assignee: Northern Electric Company Limited, Montreal, Canada

[22] Filed: June 30, 1975

[21] Appl. No.: 591,498

[52] U.S. Cl. ............................. 250/227; 250/208; 250/211 R
[51] Int. Cl.² ........................ G02B 5/14; H01J 5/16
[58] Field of Search ................ 250/208, 211, 211 J, 250/227, 226; 350/96 WG

[56] References Cited
UNITED STATES PATENTS

| | | | |
|---|---|---|---|
| 3,334,538 | 8/1967 | Steinhausen | 356/222 |
| 3,444,381 | 5/1969 | Wendland | 250/211 J |
| 3,582,658 | 6/1971 | Mita | 250/211 R |
| 3,585,416 | 6/1971 | Mellen | 250/211 R |
| 3,691,389 | 9/1972 | Ellis et al. | 250/211 J |
| 3,777,149 | 12/1973 | Marcatili | 250/227 |
| 3,777,150 | 12/1973 | Miller | 250/211 J |
| 3,804,531 | 4/1974 | Kosaka et al. | 250/226 |
| 3,821,549 | 6/1974 | Gloge | 250/211 J |
| 3,892,468 | 7/1975 | Duguay | 250/227 |

*Primary Examiner*—Alfred E. Smith
*Assistant Examiner*—David K. Moore
*Attorney, Agent, or Firm*—Sidney T. Jelly

[57] ABSTRACT

The chromatic pulse dispersion of a light beam in an optical fibre can be equalized by dispersing the light beam into a spectrum, detecting different portions of the spectrum and producing signals related to each portion, applying different time delays to the signals and then combining the signals to provide an output. The spectrum can be divided into discrete portions having a range of wavelengths, with optical delay lines, optical filters, and multiple section photodetectors used. The spectrum can be formed on one surface of a PIN diode, having the I layer of a thickness which varies along the length, giving in effect division of the spectrum into an infinite number of portions.

12 Claims, 7 Drawing Figures

U.S. Patent  Oct. 26, 1976  3,988,614
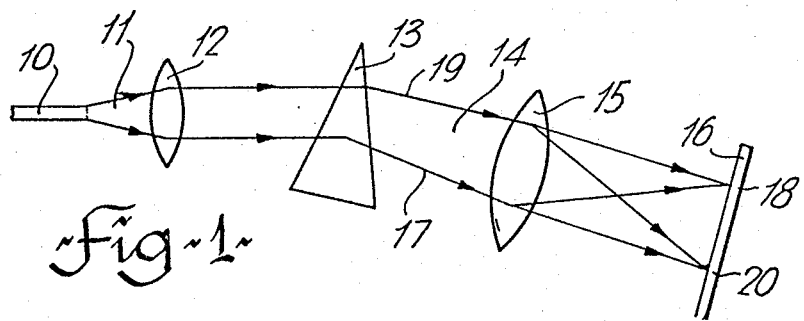
Fig-1-
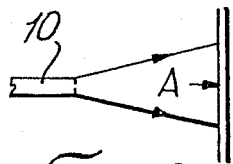
Fig-2-
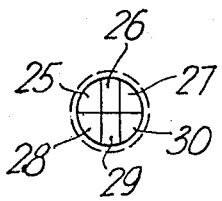
Fig-3-
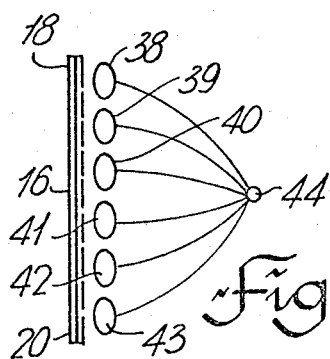
Fig-6-
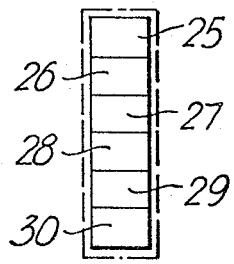
Fig-4-
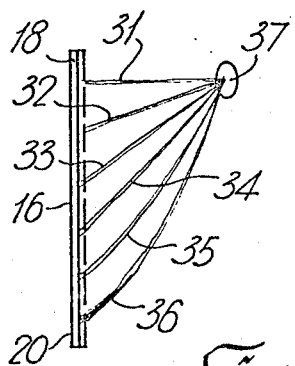
Fig-5-
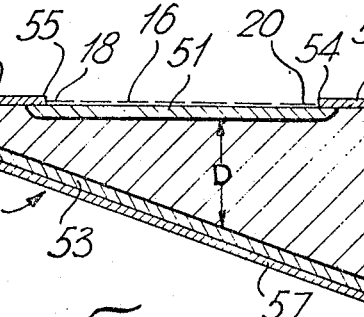
Fig-7-

EQUALIZATION OF CHROMATIC PULSE DISPERSION IN OPTICAL FIBRES

This invention relates to the equalization of chromatic pulse dispersion in optical fibres, particularly of wide spectral bandwidth light beams as emitted by light emitting diodes.

The group velocity of a pulse travelling along an optical fibre varies with wavelength, and a polychromatic light signal becomes dispersively distorted. Particularly, chromatic dispersion occurs because of the variation of light group velocity with frequency. One of the causes of such dispersion is the material of the optical fibre, and for polychromatic light signals the effect of the material becomes significant. Thus for a 8500 to 9000A regime, the differential delay over a 100A spectral bandwidth is about 1ns/km for fused silica, while other glasses can cause dispersions up to twice this value.

For a pulse from a light emitting diode, a 2 to 10ns/km spreading can occur in an optical fibre.

The present invention reduces the pulse spreadings by dividing the received light beam into sectors of differing wavelengths, detecting such sectors and applying various delays to the signals of the detectors, then recombining the signals.

Thus in accordance with one feature of the invention, a method of equalizing chromatic pulse dispersion of a light beam in an optical fibre comprises dispersing the received light beam into a spectrum having sectors of different wavelengths, detecting the sectors and producing a signal from each signal, delaying each signal and combining the signals to give an output. For example, the beam may be dispersed to form a fan of rays impinging on a plane surface, with the sectors at different positions on the plane surfaces. The rays, alternatively may impinge on a plurality of optical filters, or on a multiple section photodetector. Again the spectrum may be formed at the ends of a plurality of optical delay lines of differing lengths. Electronic delay means may also be used. A further alternative is to impinge the dispersed light beam on a top layer of a PIN detector having a charge depleted I layer thickness which increases along its length.

In another feature of the invention, apparatus for equalizing chromatic pulse distortion of a light beam in an optical fibre comprises means for dispersing the light beam into a spectrum, means for detecting different portions of the spectrum to produce a signal relating to each portion, means for applying a time delay to each signal and means for combining the signals into an output. Various means exist for dispersing the light beam, such as a spectrometer, grating and the like. The detectors can be optical filters, a multiple-section photodetector, or a plurality of optical fibres, for example. When using optical fibres as detectors they can also be used as delay means by varying the lengths of the fibres.

The invention will be readily understood by the following description of certain embodiments, by way of example, in conjunction with the accompanying diagrammatic drawings, in which:

FIG. 1 illustrates a spectrographic arrangement for producing a spatial display of the wavelength spectrum;

FIG. 2 illustrates an alternative arrangement for obtaining diversion of a light beam into a wavelength spectrum;

FIG. 3 is a view on the arrangement of FIG. 2 in the direction of arrow A;

FIG. 4 is an alternative arrangement of display;

FIG. 5 illustrates one delay structure;

FIG. 6 illustrates an alternative delay structure;

FIG. 7 illustrates a further alternative form of delay.

FIG. 1 illustrates an optical fibre, or bundle of fibres, 10, from which issues a diverging light beam 11. The beam 11 is collimated by lens system 12 after which the beam passes through a prism 13. Prism 13 angularly disperses or spreads the beam, in the plane of the drawing, to form a diverging fan of rays 14. A ray of light within the fan of rays 14 has an angular direction, relative to other rays, that depends upon its constituent wavelength. In using a prism, the angular deviation increases for shorter wavelengths.

An alternative way of obtaining the diverging fan of rays 14 is by using planar diffraction gratings, transmitting or reflecting.

The divergent fan of rays 14 passes through lens system 15 and is displayed as a spectrogram on the plane 16. Within the fan of rays 14 extreme ray 17 and all rays parallel to it are focussed down to position 18, and similarly extreme ray 19 and all rays parallel to it are focussed down to position 20.

The above description of a simple spectrometer is by example only and other known forms using planar or concave diffraction gratings and cylindrical lenses, for example, can be used.

A further alternative for producing angular dispersion of a light beam is by coupling the light into a thin film waveguide, by known techniques, and positioning a variable pitch in-plane grating above or within the guiding layer. (U.S. Pat. No. 3,814,498).

The spectrum of a light beam can also be analysed by filtration. FIGS. 2, 3 and 4 illustrate a system in which a beam of light from optical fibre, or bundle of fibres, 10, impinges on a plurality of optical filters 25 to 30, in a predetermined pattern. Each filter is of the bandpass type transmitting a different interval of the spectrum. Methods of designing such filters are well known and, for example, multiple layer dielectric interference type filters can be used. In FIGS. 2 and 3 the light beam forms a circular pattern on a circular array of filters, while in FIG. 4 a linear pattern and array of filters is used, such a linear pattern being produced by suitable optics. Instead of a series of individual or discrete filters in FIG. 4 a single filter with a bandpass varying continuously along the filter length could be used.

Simultaneously filtration of the beam and detection of the particular part of the spectrum at predetermined positions in the spectrum can be achieved with a multiple-section photodetector, for example as described and illustrated in copending application Ser. No. 507,455 filed Sept. 19, 1974, in the name of the present assignees; and now U.S. Pat. No. 3,955,082. In such a device each section experiences voltage affecting the local electroabsorptive (filtering) and photoconductive (detecting) properties. Each section then responds only to a selectively absorbed wavelength band with a corresponding output signal.

After the beam of light has been spatially displayed or the spectrum otherwise analysed, the various spectral components are delayed and then recombined. This can be obtained in several ways. FIG. 5 illustrates discrete optical delay by means of fibres. Fibre optical delay for other purposes is described in U.S. Pat. No. 3,785,719. As seen in FIG. 5, a plurality of fibres 31, 32, 33, 34, 35 and 36 are positioned behind a spectrum at the plane 16. This spectrum at plane 16 can be a continuous spectrum as in FIG. 1, or a discrete spectrum, as in FIGS. 2, 3 and 4. The earliest arriving longest wavelength components, at position 20, pass through the longest length of optical delay line 36 and the converse applies for the shortest wavelengths, at position 16, which pass through the shortest length of optical delay line 31. The compensated optical signals are finally recombined at detector 37.

As an example, six delay lines can be used to reduce 3ns of chromatic pulse spreading down to $3 \div 5 = 0.6$ns. Since the optical delay amounts to about 1ns per 20cm of fibre, length increments of 12cm would be suitable. That is, if line 31 is 12cm for example, then line 32 is 2 × 12cm, line 33 is 3 × 12 cms, and so on. Such short lengths of fibre would result in little loss apart from coupling -in loss which is uniform for all fibres. Optional differential loss may be desired to compensate for wavelength variations of source output, fibre transmission or detector sensitivity.

Discrete electronic delay can be accomplished if fibres 31 to 36 in FIG. 5 are replaced by individual detectors, as in FIG. 6. In FIG. 6 the detectors are indicated at 38 to 43 and the delay mechanism can incorporate, for example, electric cable, piezo-and acousto-optic crystals, semiconductor charge delays, microstrip delay lines or active delay circuits. Such delay mechanisms can also be applied to the outputs of the multiple-section photo-detector as referred to above. After delay of the signals, they are recombined at 44.

Optical delay may also be accomplished for a continuous spectrum, as in FIG. 1 for example, with a resonant cavity system. However the path length differences in air, with delays of 1ns/30cm, would require a rather bulky assembly of lenses and mirrors. Fibre delay lines, as in FIG. 5 for example, can be compactly coiled, although limited to a discrete array.

A form of continuous electronic delay can be accomplished by a modified PIN detector. Such a detector is shown in FIG. 7, indicated generally at 50. A standard PIN detector is geometrically redesigned to have a thickness increasing along its length. The spectrum, as at 16 in FIG. 1 for example, is caused to impinge on the top n-layer 51. This produces electron-hole pairs within the charge-depleted intrinsic region 52; the electrons and holes drift to the top n-layer 51 and the bottom p-layer 53 respectively. If the longest wavelength components — 20 in FIG. 1, which have travelled fastest through the fibre 10, generate pairs near the thickest part 54 of the detector, the associated drift transit times are longer than for pairs generated by the shorter components — 18 in FIG. 1, near the thinnest part 55 of the detector 50.

This compensating relative delay is caused by two factors: the lower electric field intensity (and resulting lower drift velocities) at 54 compared to 55 and also the greater distance for charge travel.

As a simple numerical example, consider an arbitrary intermediate thickness D along the detector 50. If V is the reverse-bias voltage applied to the top and bottom contacts 56 and 57 respectively then the (vertically uniform) electric field at the cross-section is $$V/D = v/\mu$$

where $\mu$ is the charge mobility and $v$ is the drift velocity. The transit time is then $$T = D/v = D^2/\mu V$$

or, in practical units, the thickness required for a given delay is $$D(\mu m) = 0.1\mu(cm^2/V-s)V(V)T(ns)$$

Take $\mu = 10^3$, $V = 10$, $T = 0$ to 4 so $D = 0$ to 63. The variation of T along the detector length need not be linear as pictured in FIG. 7, but may assume a form suitable for the nature of the particular spectrum at 16 in FIG. 1.

The use of a PIN detector in effect divides the spectrum into an infinite number of sectors or portions.

It will be seen that several systems are proposed for compensating the chromatic dispersion of optical fibres. Four means of spectrum separation can be used: spectrometry, integrated optics, filtration and simultaneous filtration detection. The spectral components are then selectively delayed optically via cavities of fibres or delayed electronically by several means. The recombined signals have substantially less pulse chromatic dispersion.

What is claimed is:

1. A method of equalizing chromatic pulse dispersion of a light beam in an optical fibre, comprising:
   dispersing said beam over an area in a uniform manner;
   dividing the dispersed beam into a plurality of sectors, each sector including all the wavelengths of said beam;
   selecting a different band of wavelengths in each sector, a first band being of the shorter wavelengths and each succeeding band being of longer wavelengths;
   producing a signal from each sector related to the particular band of wavelengths;
   applying a predetermined time delay to each signal, the delay being longest for the longest wavelengths, whereby the pulse dispersion of said beam is substantially equalized; and
   combining said delayed signals to give a single output.

2. A method as claimed in claim 1, including impinging said dispersed beam on a plurality of optical filters, each filter transmitting a different one of said bands of wavelengths of said light beam.

3. A method as claimed in claim 1, including impinging said dispersed beam on a multiple section photodetector, each section of said photodetector responding to a different one of said bands of wavelengths of said light beam.

4. A method as claimed in claim 1, including feeding said signals from said sectors into a plurality of optical delay lines, each signal fed to a different delay line, the delay lines of differing lengths, longer for the sector of longest wavelength and shortest for the sector of shortest wavelength.

5. A method as claimed in claim 1, including feeding said signals from said sectors to electronic delay means, a separate electronic delay means for each sector.

6. A method as claimed in claim 1, including applying said signals on a top layer of a PIN detector having a charged depleted I layer of a thickness increasing along its length, the signal related to the shortest wavelengths band impinging on the least thickness end of the PIN detector and the signal related to the longest wavelength band applied to the greatest thickness end of the PIN detector.

7. Apparatus for equalizing chromatic pulse dispersion of a light beam in an optical fibre, comprising:
   means for dispersing said light beam over an area in a uniform manner;
   means for dividing the dispersed light beam into a plurality of sectors, each sector containing all the wavelengths of said light beam;
   means for selecting a different band of wavelengths in each sector, a first band being of the shorter wavelengths and each succeeding band being of longer wavelengths, and producing a signal related to each band;
   means for applying a predetermined time delay to each signal, the delay being longest for the longest wavelengths; and
   means for combining the delayed signals into a single output.

8. Apparatus as claimed in claim 7, said means for detecting different portions of said dispersed light beam comprising a plurality of optical filters.

9. Apparatus as claimed in claim 7, said means for detecting different portions of said dispersed light beam comprising a multi-section photodetector.

10. Apparatus as claimed in claim 7, said means for applying said time delay comprising optical fibres, the fibres of varying length.

11. Apparatus as claimed in claim 7, said means for applying said time delay comprising an electronic time delay means.

12. Apparatus as claimed in claim 7, said means for applying said time delay comprising a PIN detector, said detector of varying thickness, said bands impinged on one surface of said detector, the shortest wavelengths at the thinnest end of the detector.

* * * * *